Figure 1:
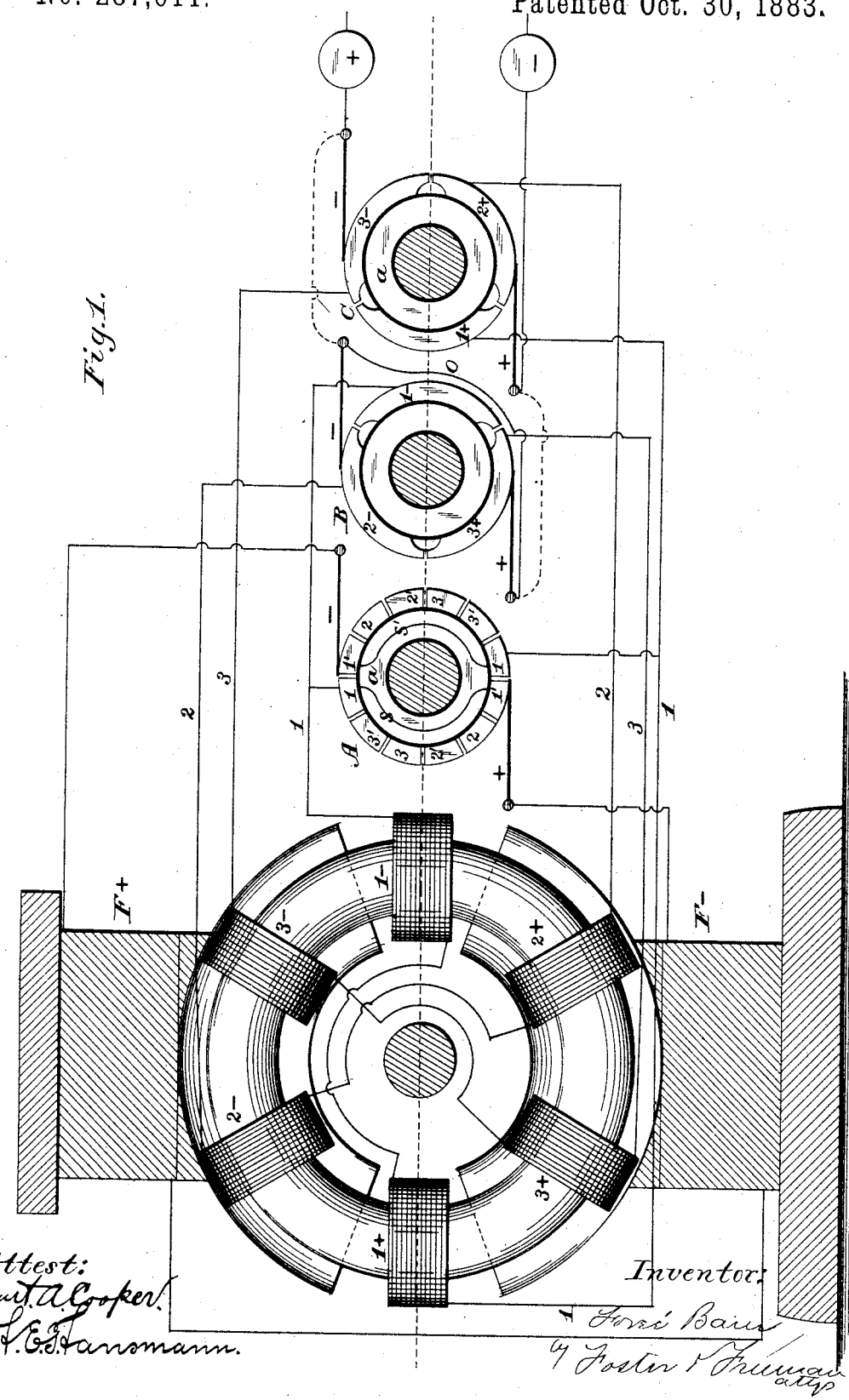

(No Model.) 2 Sheets—Sheet 2.

F. BAIN.
DYNAMO OR MAGNETO ELECTRIC MACHINE.

No. 287,611. Patented Oct. 30, 1883.

UNITED STATES PATENT OFFICE.

FORÉE BAIN, OF CHICAGO, ILLINOIS, ASSIGNOR TO THE BAIN ELECTRIC COMPANY, OF SAME PLACE.

DYNAMO OR MAGNETO ELECTRIC MACHINE.

SPECIFICATION forming part of Letters Patent No. 287,611, dated October 30, 1883.

Application filed August 25, 1883. (No model.)

*To all whom it may concern:*

Be it known that I, FORÉE BAIN, a citizen of the United States, and a resident of Chicago, in the county of Cook and State of Illinois, have invented certain new and useful Improvements in Dynamo or Magneto Electric Machines, of which the following is a specification.

My invention relates to dynamo or magneto electric machines, and has for its object to utilize the whole current generated in useful work in the circuit or circuits external to the armature, to reduce the internal resistance of the armature, and to cause the current generated by the bobbins or coils passing through a field of low potential to be separated and used for certain purposes independent of the currents generated in the bobbins or coils passing through the field or fields of higher potential; and to this end my invention consists in a method of and means for arranging the circuits and commutators, whereby these results are accomplished, as hereinafter more particularly pointed out.

It is well known that in machines of the so-called "Gramme" or "Pacinotti" type, wherein all the coils of the armature are connected in closed circuit, the bobbins or coils passing at or near the neutral points of the field-of-force magnets generate a current of much lower potential than those passing a more intense field of force; but the current from the more active portions of the coils must pass through those less active and raise them to a common potential by an expenditure of their own force, thus reducing the total energy of the machine by the amount of work performed within the armature; and, besides, in this arrangement the internal resistance of the armature is greater than necessary or desirable for the amount of current sent to the external circuit. Various means have been invented for overcoming this objection, consisting in divers arrangements of the circuits of the armature and the commutators. For instance, the coils passing at or near the neutral point have been open-circuited; but the sudden opening and closing of the circuit of the coils, besides producing an extra spark, causes the coils to heat greatly, thereby lowering their conducting qualities. Moreover, this arrangement produces a wavy and unsteady current, requiring a greater speed of revolution, in consequence of the bobbins or coils being cut out from contributing to the generation of the working electric current for a portion of the time. Other attempts have been made to overcome the stated objections by short-circuiting the bobbins or coils passing at or near the neutral points; but in these cases the current circulating in the short-circuited coils greatly heats the coils, and this short-circuited current is not only lost, as far as effective use is concerned, but is misapplied, and acts to retard the rotation of the armature. My invention differs from these in that the circuits and commutators are arranged so that the whole current generated is utilized in useful work in the circuit external to the armature. To accomplish this result the bobbins or coils are arranged so that they are connected in groups of two diametrically-opposite coils having their inner ends connected together and their outer ends connected to segments of different commutator-rings, there being preferably as many commutator-rings as there are series of bobbins or coils, which may be any number desired. One of the commutator-rings is composed of twice as many sections as there are bobbins or coils, and the sets of coils are connected to the various sections of the commutator, the diametrically-opposite sections being connected to the wires of diametrically-opposite coils, and the sections of the commutator at each side of a diametrical line are connected together. The remaining commutator-rings consist of an insulating-cylinder supporting the rings, composed of segments of conducting material insulated from each other, and so disposed on the cylinder that, preferably, the two segments connected to the opposite ends of a set of coils are in different rings. From these connections and construction it will be seen that the coils or bobbins passing through the field of force of higher potential are connected into one circuit for external work, which may be called the "major" circuit, and the coils passing through the field of force of lower potential are connected to another circuit for work, which may be called the "minor" circuit. The current of the minor circuit may be used to energize the field-of-force magnets, to run incandescent lamps, or for other purpose to which it is adapted. In case the minor circuit is used for purposes for which an intermittent current is adapted—as running incandescent lamps—instead of having twice as many segments on the commutator for the low-potential circuits as there are bobbins or coils, there may be an equal number, in which case the minor current would be reversed as each set of coils passed the neutral line.

In order to more particularly describe my invention, reference is made to the accompanying drawings, forming part of this specification, in which—

Figure 2:
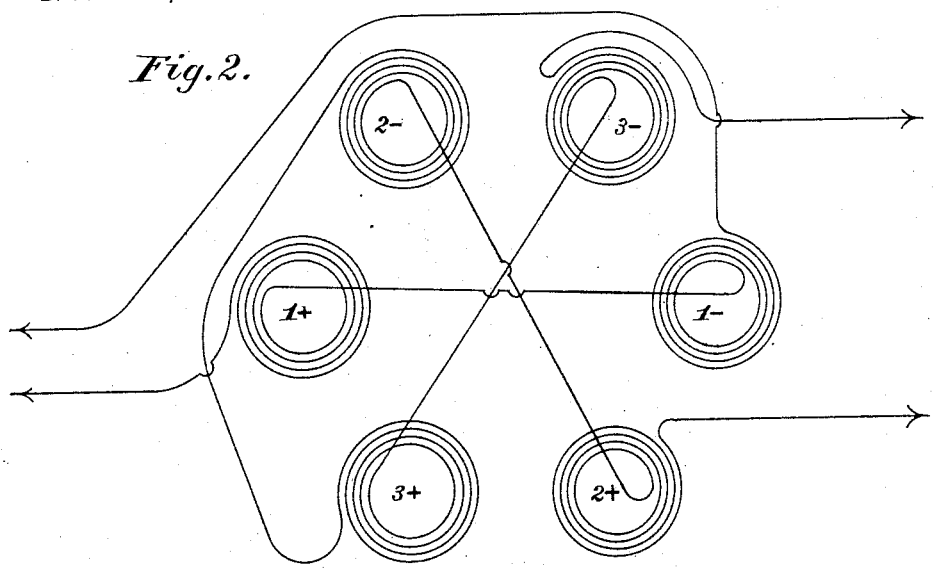
Figure 3:
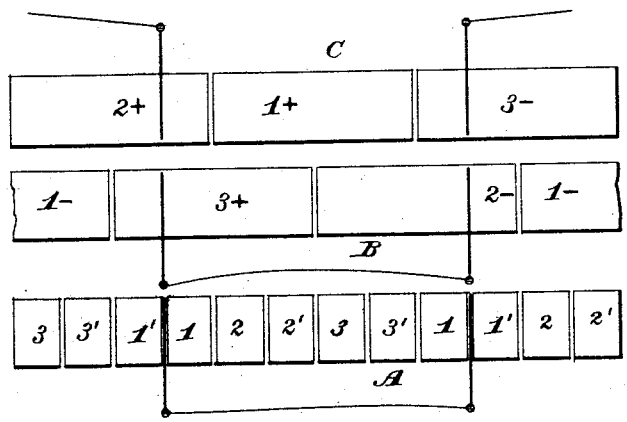
Figure 4:
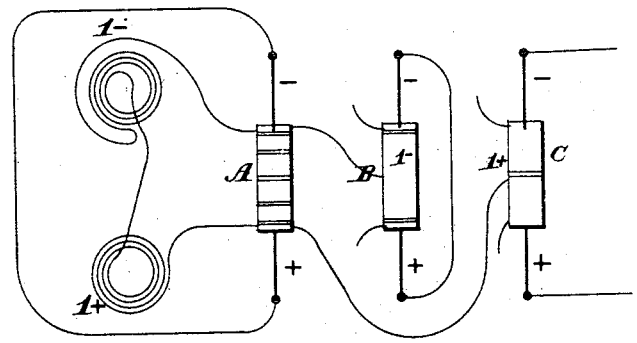

Figure 1 is a diagram illustrating the connections and constructions of my machine. Fig. 2 is a diagram of the circuits. Fig. 3 is a plan of the circumference of the commutator-rings, showing the respective positions of the brushes as illustrated in Fig. 1; and Fig. 4 is a diagram showing the manner of connecting the coils to the commutator-rings.

The generator may be of any of the well-known types. In the diagram the field-magnets F+ and F— are shown as of a conventional form. The armature in the drawings consists of a ring supporting the bobbins or coils. In this instance six coils are shown connected to the commutator-rings, which are displayed separately for better illustration.

The commutator-ring A is composed of twelve pieces or segments, numbered, respectively, 1 1', 2 2', and 3 3', corresponding to the sets of coils of the armature. The wires from each set of coils are connected to the various pieces of the commutator, the diametric opposite pieces being connected to the ends of diametric opposite coils in the armature. In the diagram Fig. 1 the ends of the coils 1+ and 1— are shown as being connected to the pieces 1 1 of the commutator, and the pieces 1 and 1' are connected together by the wires $s\ s'$. The other sets of coils, 2+ 2— 3+ 3—, are connected in a similar manner to the pieces 2 2' and 3 3', though the connections are not shown in the diagram for the sake of clearness.

Upon an insulating-cylinder, $a$, are secured the commutators B C, each consisting of a ring of three equal segments of conducting material insulated from each other, and in this instance are so disposed and connected that the terminals of any set of coils are in different rings. This arrangement is not, however, absolutely necessary, as when an even number of sets of coils are used—as eight coils and four sets—they can be placed upon the same ring opposite to each other, and so disposed or lapped on the commutator-rings that only one set will pass out from under the commutator-brush at a time, and in this case only one ring need be used. However, the former arrangement is deemed preferable.

Referring to the diagram, it will be seen that the terminals of the coils 2+ and 2— are connected, respectively, to the segments 2+ on ring C and 2— on ring B, and the terminals of the coils 3+ and 3— are connected, respectively, to the segments 3+ on ring B and 3— on ring C.

The manner of connecting the coils to the commutators is more fully shown in Fig. 4. For the sake of clearness only one set of coils is shown, as 1+ and 1—. Starting from the coils, both terminals are connected to one of the diametrically-opposed pieces 1 of commutator A, and from those the terminals proceed, the one to the segment or piece 1— on ring B, and the other to segment or piece 1+ on ring C. Commutator A closes the circuit of the coil just as its termini leave the commutator-rings B and C, and commutator-rings B C are arranged to close the circuit of the coil just as it leaves commutator A, thus preventing sparks. By means of the connection S the ends of the coils are reversed, as regards the brushes of commutator A, just after the coil passes the neutral line, thus directing the current generated at or near the neutral line in one direction into the minor circuit. From this construction and arrangement the operation is readily understood. When the armature and commutators arrive at the position shown in the diagram Fig. 1, the circuits can be traced as follows: starting at the binding-post —, thence to the brush + of the commutator-ring C, through segment 2+, by the conductor 2, to the coil 2+; thence to the coil 2—; from this by the wire 2 to the segment 2— of the commutator-ring B, to brush —; thence by conductor O to brush + and segment 3+ of commutator B; thence by conductor 3 to coil 3+, to coil 3—, by conductor 3, again, to segment 3— of commutator C, to brush 3—, to binding-post +; thence through the leading wires, the external circuit back to binding-post —.

It will be observed that coils 1+ and 1— and their corresponding segments, 1+ and 1—, of the commutator-rings B C— were not included in the circuit described, which is termed the "major" circuit; but at the moment that coils 1+ and 1— left the major circuit by their segments passing beyond the brushes of commutators B C the brushes of the commutator A made contact with the segments 1 1 of said commutator, and the current from said coils, being of a comparatively low electro-motive force, the coils at this time being shown as passing at or near the neutral point, was withdrawn from the major circuit and cut into the minor circuit, where it remained for a period of time equal to one-sixth of the time of revolution. This minor current is shown in Fig. 1 as being utilized to energize the field-of-force magnets. As the current in the coils changes direction at the moment the coils pass the neutral line, when the minor current is used to energize the field-magnets, it is necessary to provide means for changing the direction of the current generated in the coil, so as to produce a straight or continuous current. This is accomplished in the present instance by the connections shown in Fig. 1. As the coils are approaching the neutral line, the brushes of the commutator A bear upon the segments 1 1, and the current may be traced from the coil 1— to the upper segment, 1, the brush —, through the field-magnet coil, to the brush +, to the segment 1, to the coil 1+ and coil 1—. At the moment the coils 1 1 pass the neutral line the brushes bear upon the segments 1' 1', and the circuit may be traced as follows: from the coil 1— to the segment 1, across the commutator by the conductor S, to segment 1', brush +, through the field-magnets, brush —, segment 1+, conductor s', segment 1 and coil 1+, to coil 1—. Thus it will be seen that although the current in the coils as they pass the neutral line is changed in direction — the current in the external minor circuit is continuous.

When it is desired to use an alternating current in the minor circuit, the commutator A may be provided with a number of segments equal to the number of coils, when it is evident that the direction of the current would change at the time the brushes are at the center of the segments, thereby producing alternating or to-and-fro currents. It is to be understood that each set of coils as it approaches the neutral line is transferred from the major to the minor circuit in the manner above set forth regarding coils 1+ 1—.

It is evident that by a proper adjustment of the segments of the commutators the time the coils are connected to the minor circuit may be increased and the current of the machine be more evenly divided between the two circuits.

It will be seen that by the use of commutator A, arranged as above set forth, the circuit of the coils of the armature is always closed, the sets of coils being included either in the major or minor circuit, according to their position relative to the neutral line of the machine, and that there are no useless or idle brushes in the circuit. In the diagram the major circuit is shown with the coils connected in series; but they may be connected in multiple arc by disconnecting the conductor O, joining the brushes of commutators B and C, and connecting the brushes — — and + + of commutators B C, as shown in dotted lines at L.

Fig. 2 shows a diagram of the circuits as connected in Fig. 1, in which the coils 2 2 3 3 are in one circuit and 1 1 are in another. In Fig. 3 a plan view of the circumference of the commutators is shown, with lines showing the respective positions. It is of course understood that the practical neutral line is a little in advance of the theoretical line, and the brushes are adapted to be adjusted to conform to this fact.

What I claim is—

1. The combination, with an armature of an electric generator, of two commutators, the terminals of the coils of the armature being connected to both, and suitable brushes and circuit-connections, whereby the current generated may all be used in one or the other of the external circuits, substantially as described.

2. The combination, with an armature of an electric generator, of two commutators, the terminals of the coils of the armature being connected to both, and brushes and major and minor circuit connections, arranged substantially as described, whereby the coils are cut into or out of the major or minor circuits, according to the strength of the current being generated in the coils, substantially as described.

3. The combination, with an armature of an electric generator, of two commutators, each connected with an independent working-circuit, the terminals of the coils of the armature being connected to the segments of both of the commutators, and brushes being so arranged that the coils will be connected to the one circuit during a certain portion of their revolution, as they approach and recede from the neutral line, and in the other circuit when passing the field of force of higher potential, substantially as described.

4. The combination, with the armature of an electric generator, of one commutator-ring having twice as many segments as there are coils in the armature, and another commutator ring or rings having as many segments as there are coils, the terminals of the coils being connected to segments in both commutators, and brushes and connections, substantially as described.

5. The combination, with an armature of an electric generator whose coils have free terminals, of a commutator consisting of a single ring having twice as many segments as there are coil-terminals in the armature, the coils being connected to diametrically-opposite segments of the commutator, substantially as described.

6. A commutator consisting of twice as many segments as there are terminals of coils connected with it, the opposite terminals being connected to diametric opposite segments, and the terminal segments being connected through the commutator to the segment occupying a similar position on the same side of a diametric line passing through the commutator.

7. The combination, with an armature of an electric generator having coils connected in pairs, of two commutators, one consisting of a single ring having twice as many segments as there are terminals on the armature, and the other consisting of two rings, each having as many segments as there are pairs of coils, all the terminals being connected to the first commutator, and one terminal only of each pair being connected to the second commutator, substantially as described.

In testimony whereof I have signed my name to this specification in the presence of two subscribing witnesses.

FORÉE BAIN.

Witnesses:
RICHARD WATERMAN,
DANIEL GOODWIN, Jr.